(12) United States Patent
Xia et al.

(10) Patent No.: US 8,767,622 B2
(45) Date of Patent: *Jul. 1, 2014

(54) METHOD AND SYSTEM FOR MANAGING ADDRESS PREFIX INFORMATION ASSOCIATED WITH HANDOVER IN NETWORKS

(75) Inventors: Yangsong Xia, Cupertino, CA (US); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 403 days.

This patent is subject to a terminal disclaimer.

(21) Appl. No.: 13/226,166

(22) Filed: Sep. 6, 2011

(65) Prior Publication Data

US 2011/0317666 A1 Dec. 29, 2011

Related U.S. Application Data

(63) Continuation of application No. 12/022,845, filed on Jan. 30, 2008, now Pat. No. 8,014,357.

(60) Provisional application No. 60/946,719, filed on Jun. 27, 2007, provisional application No. 60/940,019, filed on May 24, 2007, provisional application No. 60/890,318, filed on Feb. 16, 2007.

(51) Int. Cl.
*H04W 4/00* (2009.01)

(52) U.S. Cl.
USPC ............................................. 370/328

(58) Field of Classification Search
CPC ............ H04W 8/087; H04W 28/0221; H04W 36/0022; H04W 36/0033; H04W 36/0077
USPC ......... 370/254, 256, 351, 352, 353, 354, 355, 370/356, 238, 331, 338, 349; 455/432.1; 709/221, 245

See application file for complete search history.

(56) References Cited

U.S. PATENT DOCUMENTS 6,751,672 B1 6/2004 Khalil et al.
7,161,929 B1 1/2007 O'Neill et al.
(Continued)

FOREIGN PATENT DOCUMENTS

CN 1484407 A 3/2004
CN 1543256 A 11/2004
(Continued)

OTHER PUBLICATIONS

Bradner, "Key words for use in RFCs to Indicate Requirement Levels," Best Current Practice, BCP 14, RFC 2119, Mar. 1997, (http://www.ietf.org/rfc/rfc2119.txt. Jun. 20, 2008).

(Continued)

*Primary Examiner* — Raj Jain
(74) *Attorney, Agent, or Firm* — Slater & Matsil, L.L.P.

(57) ABSTRACT

Method and system for managing address prefix information associated with handover in network. A fast handover process is achieved for point-to-point communication model. A mobile node send a provisional new care-of-address with an aggregate prefix part to its previous access router, which forwards the address to a new access router. The new access router in response generates a modified new care-of-address with a unique prefix part for the mobile node. Alternatively, the mobile node sends a request to the previous access router for a unique prefix. The request is forwarded from the previous access router to the new access router. The new access router assigns a unique prefix for the mobile node.

28 Claims, 6 Drawing Sheets

(56) References Cited

U.S. PATENT DOCUMENTS

| | | | |
|---|---|---|---|
| 7,356,020 | B2 | 4/2008 | O'Neill |
| 7,382,748 | B1 | 6/2008 | Bharatia et al. |
| 7,953,044 | B2 | 5/2011 | Xia et al. |
| 2003/0137974 | A1* | 7/2003 | Kwan et al. ............... 370/352 |
| 2003/0225900 | A1 | 12/2003 | Morishige et al. |
| 2004/0136348 | A1 | 7/2004 | Han |
| 2004/0218566 | A1 | 11/2004 | Han |
| 2005/0163080 | A1 | 7/2005 | Suh et al. |
| 2006/0130136 | A1 | 6/2006 | Devarapalli et al. |
| 2006/0274693 | A1 | 12/2006 | Nikander et al. |
| 2007/0091850 | A1* | 4/2007 | Lee et al. ............... 370/331 |
| 2007/0097921 | A1* | 5/2007 | Choi et al. ............... 370/331 |
| 2007/0133463 | A1 | 6/2007 | Hori et al. |
| 2007/0248083 | A1 | 10/2007 | Kasapidis |
| 2007/0268919 | A1 | 11/2007 | Sarikaya et al. |
| 2009/0003297 | A1 | 1/2009 | Xia et al. |
| 2009/0010206 | A1 | 1/2009 | Giaretta et al. |
| 2010/0097977 | A1 | 4/2010 | Rommer et al. |

FOREIGN PATENT DOCUMENTS

| | | |
|---|---|---|
| CN | 1705285 A | 12/2005 |
| CN | 1875579 A | 12/2006 |
| CN | 1879365 A | 12/2006 |
| EP | 1 679 834 A1 | 7/2006 |
| EP | 1 684 470 A1 | 7/2006 |
| EP | 1720267 A1 | 11/2006 |
| KR | 100694302 B1 | 3/2007 |
| KR | 20070061296 A1 | 6/2007 |
| WO | WO 2005/053187 A1 | 6/2005 |
| WO | WO 2006/003497 A1 | 1/2006 |

OTHER PUBLICATIONS

Haddad, et al., "Authenticating FMIPv6 Handovers," Internet-Draft, Sep. 21, 2006, draft-haddad-mipshop-fmipv6-auth-02 (work in progress), Jan. 2007. (http://tools.ietf.org/html/draft-haddad-mipshop-fmipv6-auth-02, Jun. 20, 2008).

Haddad, et al., "Secure Neighbor Discovery (SEND) Optimization and Adaptation for Mobility: The Optisend Protocol," draft-haddad-mipshop-optisend-02 (work in progress) Oct. 23, 2006, (http://tools.ietf.org/html/draft-haddad-mipshop-optisend-02, Jun. 20, 2008).

Koodli, "Fast Handovers for Mobile IPv6," RFC 4068, Jul. 2005, (http://www.ietf.org/rfc/rfc4068.txt., Jun. 20, 2008).

Jang, et al., "Mobile IPv6 Fast Handovers over IEEE 802.16e Networks," Internet-draft, dated Jan. 2, 2007, draft-ietf-mipshop-fh80216e-01 (work in progress), Jan. 2007, (http://www3.tools.ietf.org/html/draft-ietf-mipshop-fh80216e-01, Jun. 20, 2008).

Institute of Electrical & Electronics Engineering, "Draft IEEE Standard for Local and Metropolitan Area Networks: Media Independent Handover Services," IEEE P802.21/D00.05, Jan. 2006.

Madanapalli, "Analysis of IPv6 Link Models for 802.16 based Networks," Internet-draft, draft-ietf-16ng-link-model-analysis-02 (work in progress), dated Jan. 11, 2007, (http://tools.ietf.org/html/draft-ietf-16ng-link-model-analysis-02, Jun. 20, 2008).

Patil, et al., "IPv6 Over the IP Specific part of the Packet Convergence sublayer in 802.16 Networks," Internet-Draft dated Jan. 23, 2007, draft-ietf-16ng-ipv6-over-ipv6cs-07 (work in progress), http://tools.ietf.org/html/draft-ietf-16ng-ipv6-over-ipv6cs-07, Jun. 20, 2008).

Koodli, et al., "Fast Handovers for Mobile IPv6," draft-ietf-mobileip-fast-miv6-08.txt, Oct. 10, 2003, pp. 8-14, 32.

International Search Report and Written Opinion of PCT Application No. PCT/CN2008/070319, mailed Jun. 5, 2008, 12 pages total.

Narten, T., et al., "Neighbor Discovery for IP Version 6 (IPv6)," Internet Engineering Task Force, Network Working Group, Request for Comments: 2461 (RFC 2461), Standards Track, Dec. 1998, 87 pages.

Sun, et al., "Mobile IP Technique," ISBN 7-5053-8754-5, Version 1, Aug. 2003, 28 pages, Publishing House of Electronics Industry, Beijing.

Yokota, H., et al., "Mobile IPv6 Fast Handovers for 3G CDMA Networks; draft-ietf-mipshop-3gfh-01.txt," Internet Engineering Task Force, Network Working Group, Internet-Draft, XP015047946, Oct. 23, 2006, 40 pages, The Internet Society.

Jang, H., et al., "Mobile IPv6 Fast Handovers over IEEE 802.16e Networks; draft-ieff-mipshop-fh80216e-01.txt," Internet Engineering Task Force, MIPSHOP Working Group, Internet-Draft, XP 015049574, Jan. 2, 2007, 20 pages, The Internet Society.

Gundavelli, S., et al., "Proxy Mobile IPv6; draft-sgundave-mip6-proxymip6-01," Internet Engineering Task Force, NETLMM WG, Internet-Draft, Jan. 5, 2007, 39 pages, The Internet Society.

Jang, H., et al., "DHCP Options for Home Information Discovery in MIPv6; draft-ietf-mip6-hiopt-17.txt," Internet Engineering Task Force, MIP6 Working Group, Internet-Draft, May 22, 2008, 22 pages.

International Preliminary Report on Patentability, International Application No. PCT/CN2008/070319, Applicant: Huawei Technologies Co., Ltd., Date of issuance: Aug. 19, 2009, 5 pages.

Supplementary European Search Report, European Application No. 08706692.4-2413, International Application No. PCT/CN2008/070319, Applicant: Huawei Tech. Co., Ltd., Dated: Oct. 4, 2010, 7 pages.

Chinese Office Action, Chinese Application No. 200880000951.1, Dated: Mar. 30, 2010, 13 pages.

Extended European Search Report, Applicant: Huawei Technologies Co., Ltd., Application No. 12191350.3-2413, Feb. 5, 2013, 6 pages.

Chowdhury, K., et al., "MIP6-bootstrapping for the Integrated Scenario draft-ietf-mip6-bootstrapping-integrated-02.txt," Network Working Group Internet-Draft, Feb. 7, 2007, 39 pages.

Chowdhury, K., et al., "RADIUS Mobile IPv6 Support draft-ietf-mip6-radius-02.txt," Network Working Group Internet-Draft, Mar. 7, 2007, 65 pages.

"Communication of a Notice of Opposition," Application No. 08706692.4, Applicant: Huawei Technologies Co., Ltd., mailing date: Mar. 31, 2014, 33 pages.

Xia, F., et al., "Fast Handovers for Mobile IPv6 Operation on Point-to-Point Links draft-xia-mipshop-fmip-ptp-01," Network Working Group Internet-Draft, Jul. 5, 2007, pp. 1-14.

* cited by examiner

METHOD AND SYSTEM FOR MANAGING ADDRESS PREFIX INFORMATION ASSOCIATED WITH HANDOVER IN NETWORKS

This application is a continuation of U.S. Non Provisional application Ser. No. 12/022,845, filed on Jan. 30, 2008 and issued on Sep. 6, 2011 as U.S. Pat. No. 8,014,357, which claims priority to U.S. Provisional Application No. 60/946,719, filed Jun. 27, 2007, U.S. Provisional Application No. 60/940,019, filed May 24, 2007 and U.S. Provisional Application No. 60/890,318, filed Feb. 16, 2007, all of which are hereby incorporated by reference in their entireties.

BACKGROUND

The present invention relates in general to telecommunication techniques. More particularly, the invention provides a method and system for performing handover process in networks. In a specific embodiment, the present invention provides a technique for performing fast handover process in a Mobile IP environment wherein one or more mobile nodes are connected to access routers using point-to-point links. Certain embodiments of the invention are used in the Mobile IPv6 standard. Merely by way of example, the invention is described as it applies to wireless access network, but it should be recognized that the invention has a broader range of applicability.

Techniques for wireless communications have progressed through the years. For example, satellite wireless communication networks have been developed where satellites are used to relay voice communication among wireless. There are other techniques as well. Over the recent years, the "cellular" wireless communication networks have become one of the most widely used technique for providing wireless communication.

A wireless network usually includes, among other things, access routers, access points (which may also be referred to as base stations) and mobile nodes For example, a mobile node (MN) refers to a station that is to be used while in motion or during halts at unspecified geographic locations. As an example, the MN is a mobile communication device. The MN can also be a cellular phone, a PDA, a laptop, etc. An access point (AP) refers to a set of equipment that can provide connectivity, management, and control for one or more mobile stations. For example, an AP includes a base station that is configured to provide wireless connectivity. An access router (AR) refers to an equipment set that is configured to provide routing services. In certain situation, an AR may include an AP. In embodiments, ARs can be first Internet Protocol (IP) routers that MNs encounter, such as Broadband Remote Access Services (BRAS), Media Access Gateways (MAGs), or Access Service Network Gateways (ASN-GW). ARs may be Packet Data Servicing Nodes (PDSN) in a 3GPP2 network, or Gateway GPRS Support Nodes (GGSN) in a 3GPP network. As merely an example, a core service network (CSN) refers to a set of network functions that provide IP connectivity services to mobile stations. In an exemplary process flow, a MS obtains radio access from a BS. Through the BS, the MS obtains IP services.

Figure 1:
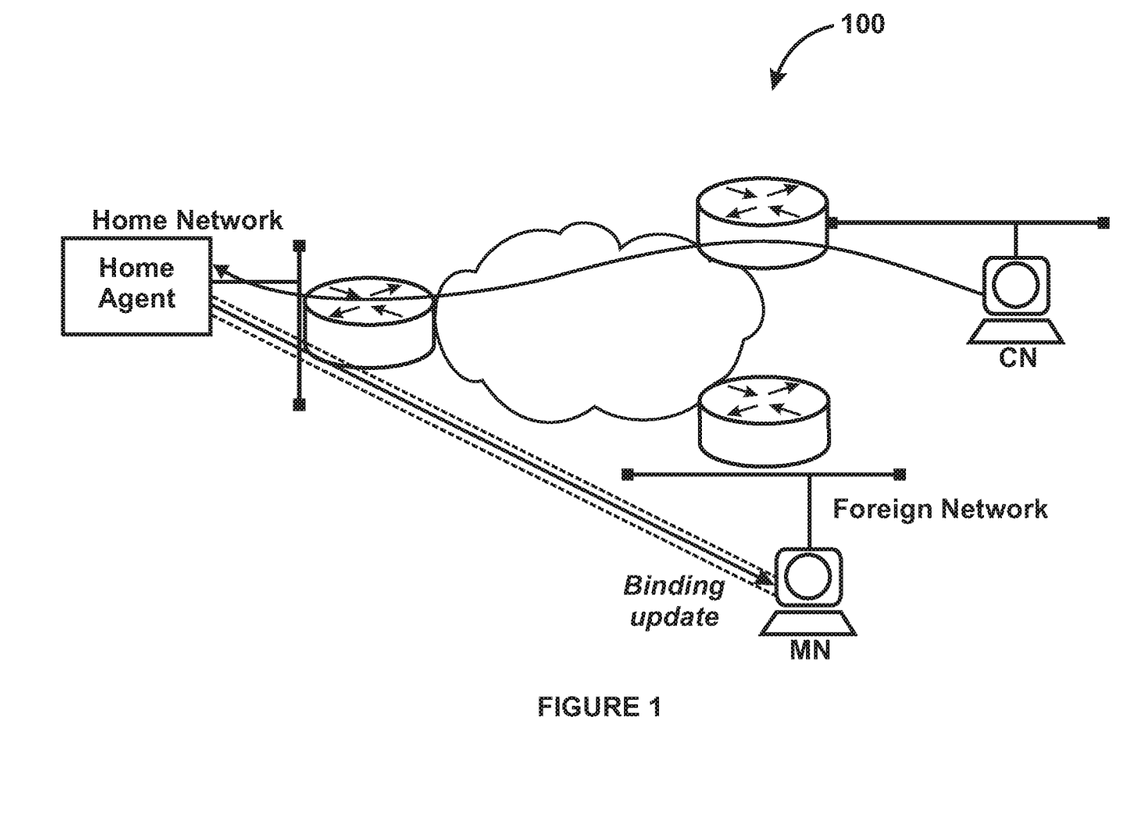
FIG. 1 is a simplified diagram illustrating a conventional telecommunication network.

In a telecommunication network, a mobile station is typically connected to a local network, which provides, among other things, radio connectivity. The local network also establishes a connection between the mobile station and a network where a variety of services (e.g., routing, Internet protocol routing, etc.) are provided. FIG. 1 is a simplified diagram illustrating a conventional telecommunication network. As an example, the conventional telecommunication network 100 as illustrated in FIG. 1 complies with Mobile IP networks.

As shown in FIG. 1, a mobile node is connected to a foreign network and performs binding update with its home network. For example, a handover process is used for the mobile node to move its connection from a foreign network to another network. When a mobile node is connected to the foreign network, a CoA is provided for the mobile node for this particular connection. When the mobile node connects to another network, a new CoA is typically assigned to the mobile node and the newly established link thereof.

Figure 1A:
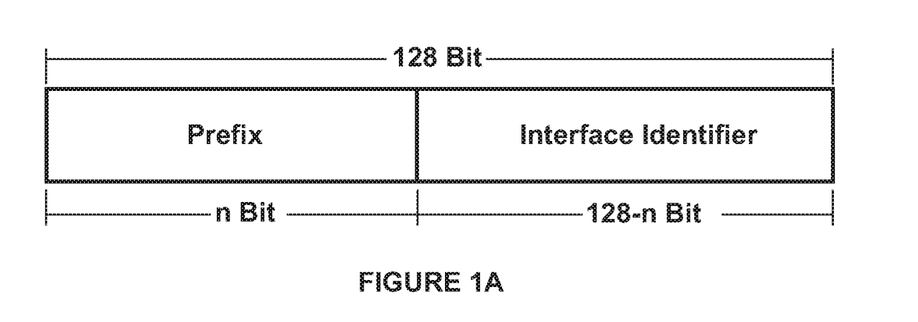
FIG. 1A is a simplified diagram illustrating addressing structure according to the IPv6 standard.

According to various network standards, addresses include various segments or parts. For example, according to the IPv6 standard, a 128 bit address includes a prefix segment and an interface identifier segment. The prefix segment includes a specific address prefix that is associated with a group of network entities, which may be grouped based on access service routers. As an example, the interface identifier is associated with a particular network interface. FIG. 1A is a simplified diagram illustrating addressing structure according to the IPv6 standard. As shown, an address includes a prefix and an interface identifier.

The process of performing handover and assigning CoA can be a slow and inefficient process. Over the past, various types of conventional techniques have been developed. For example, fast handovers for Mobile IPv6 (FMIPv6) aims at reducing the handover latency by reducing the time to configure a new care-of address (CoA) for a mobile node (MN). This standard proposes a handover process for shared link connections, but not for point-to-point connections. Unfortunately, these conventional techniques are often inadequate.

Therefore, an improved system and method for performing handover is desired.

SUMMARY OF THE INVENTION

The present invention relates in general to telecommunication techniques. More particularly, the invention provides a method and system for performing handover process in communication networks. In a specific embodiment, the present invention provides a technique for performing fast handover process in a Mobile IP environment wherein one or more mobile nodes are connected to access routers using point-to-point links. Certain embodiments of the invention are used in the Mobile TPv6 standard. Merely by way of example, the invention is described as it applies to wireless access network, but it should be recognized that the invention has a broader range of applicability.

According to an embodiment, the present invention provides the method that includes the following processes. A previous access router advertises one or more aggregate prefixes of a new access router to a mobile node. The mobile node generates its provisional set of new care-of-addresses with these prefix(es). The mobile node initiates an FMIPv6 procedure, which involves transmitting the provisional set of new care-of-addresses. Once detecting the provisional set of new care-of-addresses of the mobile node, the new access router assigns a unique prefix (which may also be referred as per-mobile prefix or dedicated prefix) to mobile node and formulates an alternative NCoA called modified NCoA, using which the mobile node configures its final set of care-of-addresses.

According to another embodiment, the present invention provides a system for communication. The system includes a mobile node. The system also includes a first access router, the first access router having a first address, the first access router coupled to the first mobile node using at least a first CoA. The system additionally includes a second access router. The first access router is configured to send at least an aggregate prefixes to the mobile node, the aggregate prefixes being associated with the second access router. The mobile node adapted to generate at least a second CoA based on the first plurality of address prefixes, the second CoA including a unique prefix. The second access router is configured to generate a third CoA based at least on the unique prefix and the second CoA.

According to yet another embodiment, the present invention provides a method of perform handover in a network. The method includes providing a first access router. The method also includes forming a first communication link between a mobile node and the first access router, the mobile node using at least a first care-of-address (CoA), the first CoA being associated with the first access router. The method additionally includes sending a first request from the mobile node to the first access router for at least a unique prefix. The method further includes processing the first request. Moreover, the method includes identifying a second access router based on the first request. Also, the method includes sending a second request from the first access router to a second access router. The method further includes processing the second request by the second access router. The method further includes assigning the unique prefix to the mobile node in response to the second request. The method also includes sending a handover acknowledge message from the second access router to the first access router. The method includes sending a proxy router advertisement message from the first access router to the mobile node, the proxy router advertisement message including the unique prefix.

According to yet another embodiment, the present invention provides a network apparatus. The apparatus includes a first network interface, the first network interface being configured to connect to a mobile node, the mobile node using at least a first care-of-address (CoA), the first CoA being associated with the network apparatus, the first network interface being configured to receive a first request from the mobile node for at least a unique prefix and to send the unique prefix to the mobile node. The apparatus also includes a memory being configured to store system information. The apparatus further includes a processor being configured to process the first request and identify a router, the processor further being configured to generate a second request for a unique prefix. The apparatus also includes a second network interface being configured to send the second request to the router and receive a response from the router, the response include information for at least the unique prefix.

According to yet another embodiment, the present invention provides a network apparatus. The network apparatus includes a network interface, the network interface being connected to a router, the network interface being adapted to receive a first request for at least a unique prefix from the router, the first request including at least a first CoA, the first CoA including an aggregate prefix, the network interface being configured to send a response to the router. The apparatus also includes a memory being configured to store system information. The apparatus further includes a processor being configured to process the first request, the processor further being configured to determine whether the first CoA is associated with the network apparatus, the processor is further configured to generate a second CoA for a mobile node, the second CoA including the unique prefix that is associated with the network apparatus.

It is to be appreciated that the various embodiments of the present invention provide advantages over conventional techniques. In various embodiments, the present invention provides an efficient technique for performing handover process in networks. Among other things, by providing and managing address prefixes according to embodiments of the present invention, access routers in communication are able to efficiently assign prefixes for new CoA formulation for migrating MNs. In comparison to conventional techniques, embodiments of the present invention are more efficient and reliable, as address spaces for MNs are conserved. In addition, it is to be appreciated that embodiments of the present invention can be implemented for conventional network techniques and standards. For example, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF ILLUSTRATIVE EMBODIMENTS

In various embodiments, the invention provides a method and system for performing handover process in wireless communication networks. In a specific embodiment, the present invention provides a technique for performing fast handover process in a Mobile IP environment wherein one or more mobile nodes are connected to access routers using point-to-point links, where a set of MAC transport connections between an MN and an AR are treated as a single link. Certain embodiments of the invention are used in the Mobile TPv6 standard. Merely by way of example, the invention is described as it applies to wireless access network, but it should be recognized that the invention has a broader range of applicability.

As explained above, conventional techniques for performing handover process are inadequate. For example, the fast handovers for Mobile TPv6 (FMIPv6) aims at reducing the handover latency by reducing the time to configure a new CoA (NCoA) for a mobile node. In FMIPv6, MN formulates a prospective NCoA when it is still present on the previous access router (PAR)'s link. As a result, the newly proposed FMIPv6 process has been limited to application involving shared link communications, and this process does not offer a solution for point-to-point links. In point-to-point links, each link is allocated a separate, unique prefix or a set of unique prefixes by the AR.

In various existing schemes, a handover process provides different TPv6 link models that are suitable for 802.16 based networks and provides analysis of various considerations for each link model and the applicability of each link model under different deployment scenarios. Yet another conventional technique specifies the addressing and operation of TPv6 over the TPv6 specific part of the packet convergence sub-layer of IEEE Std 802.16e, and Point-to-Point Link Model is recommended. Also, 3GPP and 3GPP2 have earlier adopted the Point-to-Point link model. Unfortunately, it is difficult to formulate a prospective NCoA using these conventional techniques. For example, MN configures its NCoA from the prefix shared by MNs which breaks the Point-to-Point link model.

Figure 2:
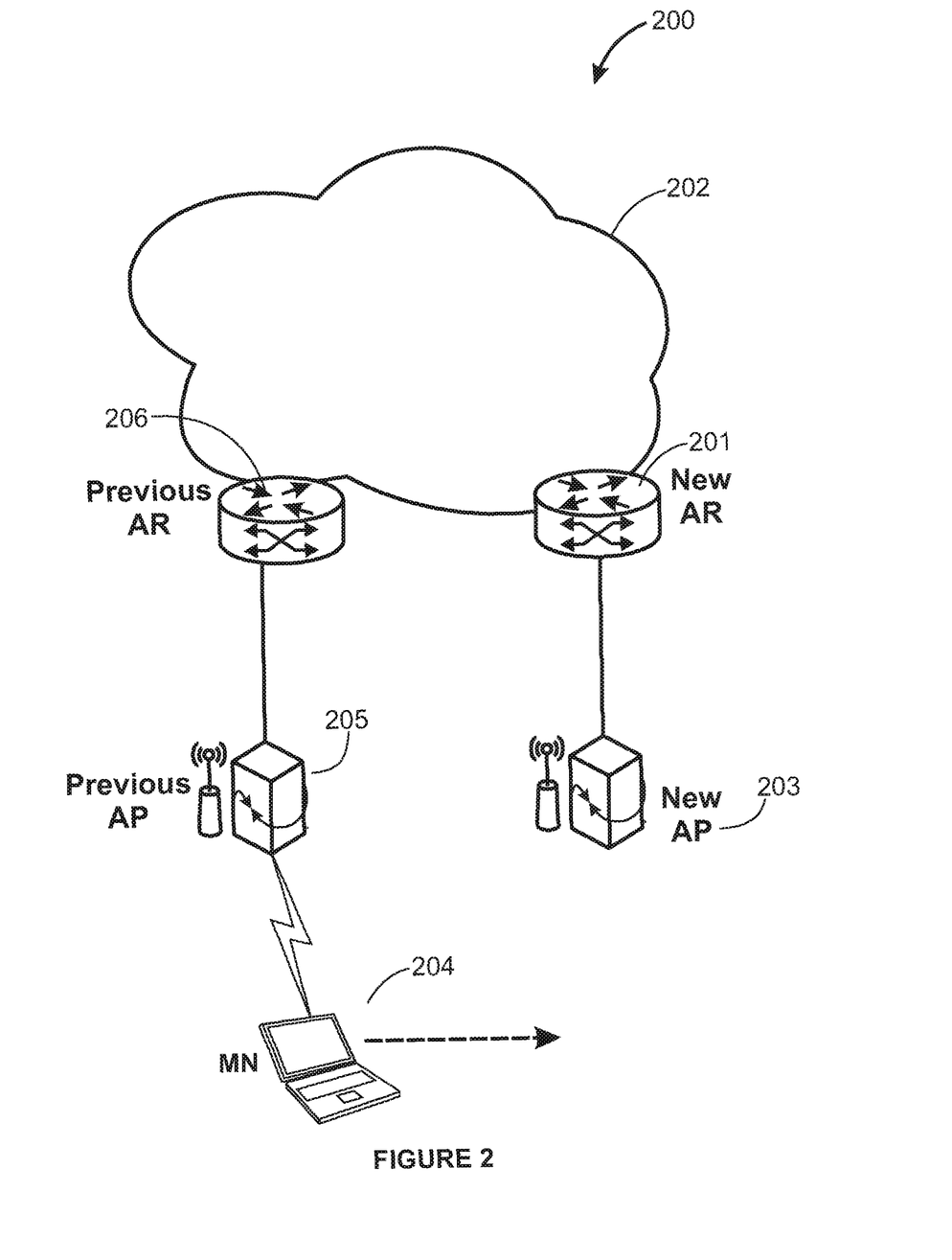
FIG. 2 is a simplified diagram illustrating a wireless system according to an embodiment of the present invention.

FIG. 2 is a simplified diagram illustrating a wireless system according to an embodiment of the present invention. This diagram is merely an example, which should not unduly limit the scope of the claims. One of ordinary skill in the art would recognize many variations, alternatives, and modifications.

As shown in FIG. 2, a wireless network system includes the following components: [0029] 1. a mobile node 204; [0030] 2. a previous access point 205; [0031] 3. a previous access router 206; [0032] 4. a network 202; [0033] 5. a new access router 201; and [0034] 6. a new access point 203.

The mobile node (MN) 204 as shown is connected to the previous access router (PAR) 206 via the previous access point (PAP) 205. During the handover process, the MN 204 is switching to the new access router (NAR) 201. Depending on the application, the handover process may be initiated in many ways, such as the movement of the MN 204 from one service area to another.

In a specific embodiment, the PAR 206 advertises one or more aggregate prefixes of the NAR 201 to the MN 204. The MN 204 formulates its provisional NCoAs with the aggregate prefix(es). The MN 204 initiates an FMIPv6 procedure, which provides the provisional NCoAs. Once detecting provisional NCoAs of the MN 204, the NAR 201 assigns a unique prefix called the dedicated prefix to MN 204. A specific embodiment of the invention includes both reactive and predictive modes of FMIPv6.

Figure 3:
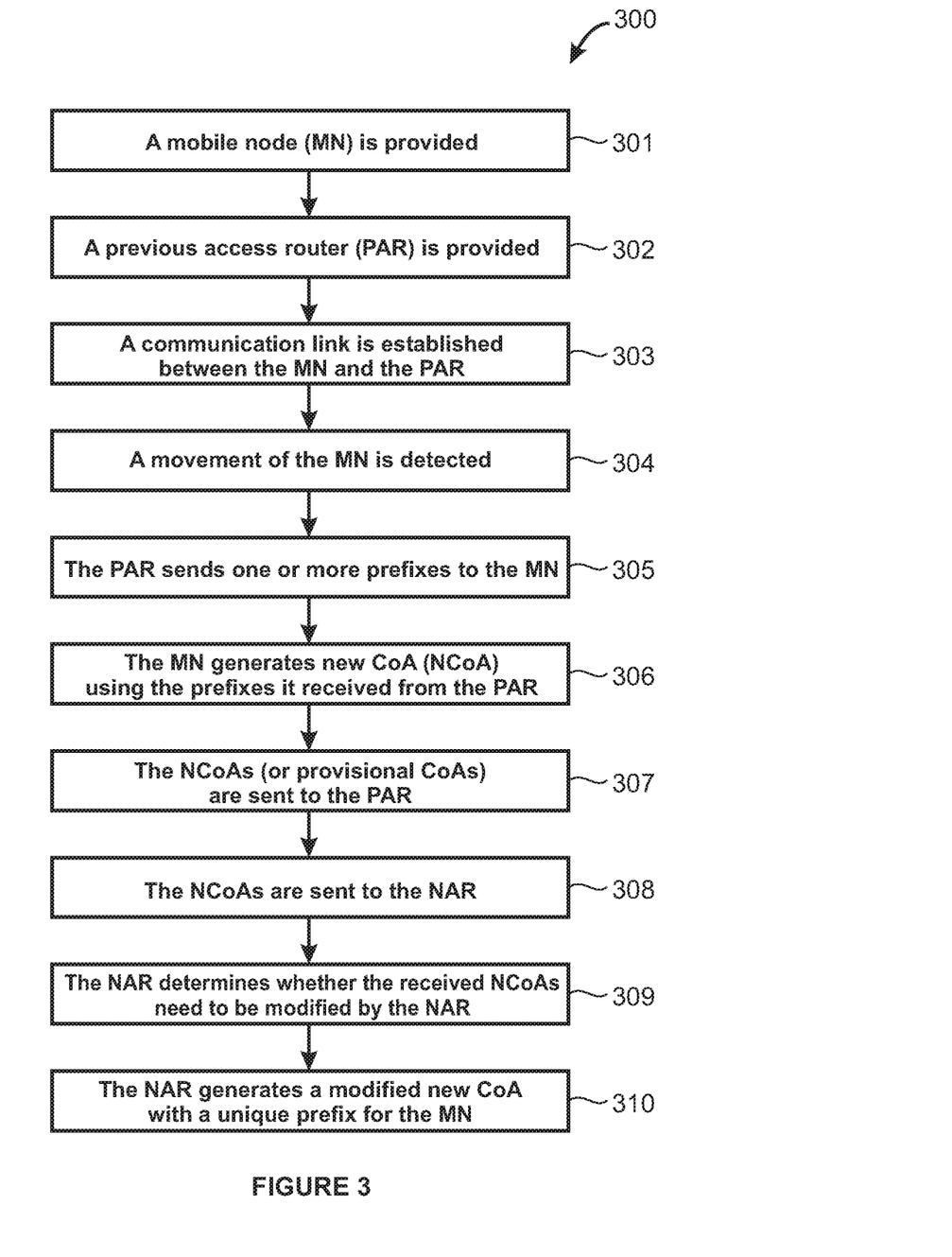
FIG. 3 simplified diagram illustrating a process for a handover process according to an embodiment of the present invention.

FIG. 3 simplified diagram illustrating a process for a handover process according to an embodiment of the present invention. This diagram is merely an example, which should not unduly limit the scope of the claims. One of ordinary skill in the art would recognize many variations, alternatives, and modifications. For example, various steps in the process may be added, removed, modified, replaced, repeated, rearranged, and/or overlapped.

At step 301, a mobile node (MN) is provided. Depending on the application, the mobile node may be a cellular phone, a multimedia device, a PDA, a laptop computer, etc. For example, the MN is compatible with various wireless standards, such as WiMAX, etc.

At step 302, an access router is provided, which is referred to as a previous access router (PAR). As an example, the PAR is configured to perform various routing functions. For example, the PAR assigns one or more prefixes for MNs that are connected to the PAR. Depending on the application, the PAR may be connected a larger network, such as the Internet.

At step 303, a communication link is established between the MN and the PAR. For example, the communication link is a point-to-point link. Each link is allocated one or more separate, unique prefixes by the PAR. As an example, the MN accesses the PAR through an access point, which may be an integral part of the PAR or a separate entity.

As an example, in Point-to-Point link model, each MN has one or more dedicated prefixes. That means different MNs have different prefixes, which could be allocated dynamically. When an MN attaches an AR, the AR should delegate one or more dedicated prefixes for it. When the MN detaches from the AR, the MN's prefixes are released, and can be reused by other MNs. Potentially the number of unique prefixes in this operation can be huge. In comparison, conventional techniques typically provide that the prefix in AR-Info is one of valid interfaces to which the Access Point (identified by AP-ID) is attached, and the prefix is not a dedicated prefix.

At step 304, a movement of the MN is detected. For example, movement detection is a part of the mobile IP standard, which an MN quickly detects that it has moved to a new subnet by providing the new access point and the associated subnet prefix information when the MN is still connected to its current subnet. For example, the MN discovers available access points using link-layer specific mechanisms (e.g., a "scan" in WLAN) and then requests subnet information corresponding to one or more of those discovered access points. An MN sends a Router Solicitation for Proxy Advertisement (RtSolPr) to the PAR to resolve one or more Access Point Identifiers to subnet-specific information. Depending on the application, the movement of the MN may be detected by other ways. In various applications, needs of updating address prefixes can be triggered for reasons other than the movement of the MN. For example, an MN receives aggregate prefix in AR-Info of PrRtAdv, and formulates its provisional NCoA. Then, the MN sends a fast binding update (FBU) message to PAR with NCoA option, link layer information of the MN, and so on. The PAR sends this information to an NAR in HI message.

At step 305, the PAR sends one or more prefixes to the MN. For example, the prefixes are associated with an NAR which the MN migrates to. In a specific embodiment, the PAR sends a Proxy Router Advertisement (PrRtAdv) message containing one or more aggregate prefixes. For example, when attachment to the access point with AP-ID takes place, the MN knows the corresponding new router's coordinates including its prefix, IP address, and L2 address. In a point-to-point link, the AR is configured to broadcast the prefixes (MNs route information) in an aggregation form. For example, each AR can be assigned a "/48" prefix, while an MN's "/64" prefix is derived from the "/48" prefix extension. For example, the higher-level prefix is commonly referred to as the Aggregate Prefix.

At step 306, the MN generates new CoA (NCoA) using the prefixes it received from the PAR. For example, an AR-Info message contains an access router's L2, IP addresses, and a prefix. Depending upon the application, the prefix can be an aggregate prefix or a prefix that is valid on the interface to which the Access Point (identified by AP-ID) is attached. With the prefix provided in the PrRtAdv message, the MN formulates a prospective NCoA.

At step 307, the NCoAs (or provisional CoAs) are sent to the PAR. For example, the NCoAs are sent to the PAR through the access point.

At step 308, the NCoAs are sent to the NAR. Depending on the application, the NCoAs can be sent to the NAR from the PAR via various types of communication links.

At step 309, the NAR determines whether the received NCoAs need to be modified by the NAR. For example, an explicit indication is sent to the NAR to indicate that the NCoAs need to be modified. As another example, the NAR processes the NCoAs using conventional techniques if the prefix of the NCoAs is not an aggregate prefix of the NAR. In certain applications, there is no specific indication from the PAR. Merely by of an example, on receiving the HI, NAR processes the message using conventional techniques if the prefix of the NCoA is not an aggregate prefix of the NAR. Otherwise, the NAR allocates one or more dedicated prefixes for the MN based on its link-layer address (MAC). NAR generates a new NCoA by replacing the provisional NCoA's prefix part with the dedicated prefix. The modified NCoA is then delivered to the MN in the NCoA field of HAck message. In an alternative embodiment, the MN is required to use the modified NCoA.

At step 310, the NAR generates a modified new CoA with a unique prefix for the MN if the prefix of the NCoAs is an aggregate prefix of the NAR, or there is a specific indication from the PAR. For example, the NAR allocates one or more dedicated prefixes for the MN based on its link-layer address (MAC) and/or other information. In a specific embodiment, the NAR generates the new CoA by replacing the prefix of the received NCoA with a dedicated prefix. The modified NCoA is then delivered to the MN in the NCoA field of HAck message. In a specific embodiment, the MN is required to use the modified NCoA. As an example, the dedicated prefix is derived from the aggregate prefix and allocated for an MN. If MN does not actually migrate to the NAR, then the prefix assigned to the MN may be reclaimed and assigned to another MN. This is because there could be a large number of such prefixes in high mobility areas.

According to an embodiment of the invention, a method for FMIPv6 Operation on Point-to-Point Links is provided in which MN is assigned a dedicated prefix. In a specific embodiment, a method is provided which includes the aggregate prefix in the AR-Info. Then the MN can use the prefix to formulate NCoA. In an embodiment, this is called provisional NCoA. In an embodiment each aggregate prefix advertised by the candidate NARs is unique.

In an embodiment of the invention, a method is provided in predictive mode of FMIPv6. Depending on the embodiment, the method includes one of more of the following processes.

According to another embodiment of the invention, a method is provided in reactive mode of FMIPv6. In a specific embodiment, an MN encapsulates FBU in FNA and sends them together to NAR. The source address of FNA is the provisional NCoA. If the prefix of the NCoA corresponding to the FNA message is not an aggregate prefix, the NAR processes the message as per conventional technique. Otherwise, the NAR assigns one or more prefixes for the MN based on Mobility Header Link-Layer Address (MH-LLA) option in the FNA. In an embodiment, a modified NCoA is formulated by replacing the provisional NCoA's prefix part. The NAR replaces NCoA in the encapsulated FBU with the modified NCoA and sends the FBU to the PAR. In an alternative embodiment, the NAR sends a Router Advertisement with the NAACK option in which it includes the modified NCoA.

Depending on the application, predictive and/or reactive modes of FMPv6 may be used.

As merely an example, the following adaptation can be used in predictive mode of FMIPv6. First, an MN receives aggregate prefix in AR-Info of PrRtAdv, and formulates its provisional NCoA. Then, the MN sends FBU message to PAR with NCoA option, link layer information of MN, and so on. The PAR sends this information to an NAR in HI message. In order to determine the NAR's address for the HI message, the PAR can perform longest prefix match of NCoA (in FBU) with the prefix list of neighboring access routers.

Next, on receiving the HI, NAR processes the message if the prefix of the NCoA is not an aggregate prefix of the NAR. Otherwise, the NAR allocates one or more dedicated prefixes for the MN based on its link-layer address (MAC). NAR generates a new NCoA by replacing the provisional NCoA's prefix part with the dedicated prefix. The modified NCoA is then delivered to the MN in the NCoA field of HAck/FBack messages. The MN uses the modified NCoA.

As merely an example, the following adaptation can be used in reactive mode of FMIPv6. The MN sends UNA to NAR. The source address of UNA is the provisional NCoA. If the prefix of the NCoA in the UNA message is not an aggregate prefix, the NAR processes the message. Otherwise, the NAR assigns one or more prefixes for the MN based on Link-Layer Address (LLA) option in the UNA. NAR MAY use DHCP/AAA protocol to request release prefixes for this MN from a DHCP/AAA server triggered by UNA using. A modified NCoA is formulated by replacing the provisional NCoA's prefix part with the dedicated prefix. The NAR MUST sends a Router Advertisement with the NAACK option in which it includes the modified NCoA to the source IP address present in UNA. The MN MUST use the modified NCoA. NAR MAY advertise more dedicated prefixes to MN in subsequent RAs. The MN sends the FBU to the PAR with source address set to the modified NCoA.

Figure 4:
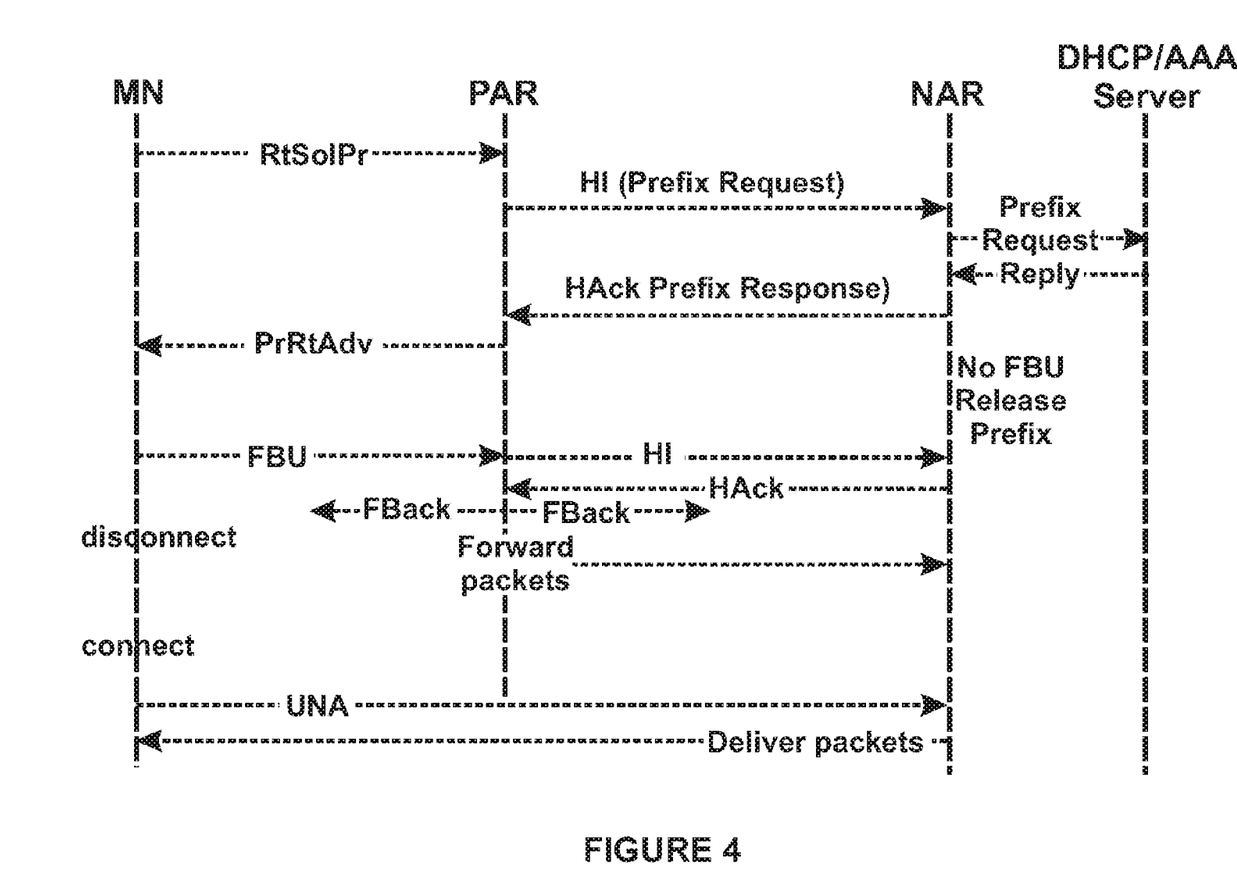
FIG. 4 is a simplified flow diagram illustrating a process for performing handover in a network according to a specific embodiment of the present invention.

FIG. 4 is a simplified flow diagram illustrating a process for prefix signaling. This diagram is merely an example, which should not unduly limit the scope of the claims. One of ordinary skill in the art would recognize many variations, alternatives, and modifications.

As shown in FIG. 4, the mobile node sends a PAR an Router Solicitation for Proxy Advertisement (RtSolPr) to its access router to resolve one or more Access Point Identifiers to subnet-specific information. Upon receiving the RtSolPr, the PAR processes the message and determines where the prefix is obtained. For example, if the PAR determines that the NAR, which is responsible for delegating dedicated prefixes, has one or more address prefixes that the MN is requesting, the PAR sends a prefix request to the NAR in an HI message. Depending on the application, the NAR process the prefix request and generates dedicated prefixes itself. Alternatively, the NAR may request dedicated prefixes from an external network entity. In a specific embodiment, the prefix is obtained from a DHCP server. For example, the NAR may use DHCP prefix delegation (PD) to request/release prefixes from a DHCP server.

Once the NAR gets the unique prefix, it sends it to the PAR. For example, the prefix is encapsulated in a handover acknowledge (HACK) message. The PAR sends the prefix to the MN using a proxy router advertisement (PrRtAdv) message. Upon receiving the PrRtAdv message, the MN is able process the message and utilize the prefix. For example, the MN may use the prefix to generate CoA that is to be used in conjunction with the NAR connection.

Figure 5:
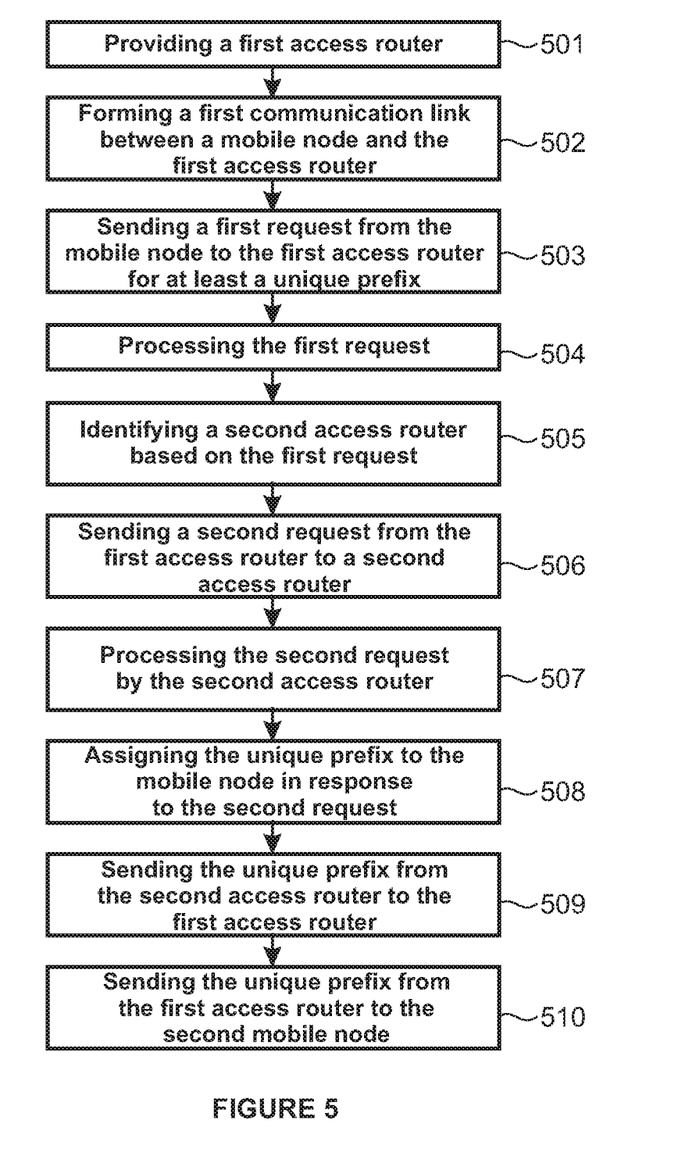
FIG. 5 is a simplified flow diagram illustrating a process for managing address prefixes in a network according to an embodiment of the present invention.

FIG. 5 is a simplified flow diagram illustrating an embodiment of the present invention. This diagram is merely an example, which should not unduly limit the scope of the claims. One of ordinary skill in the art would recognize many variations, alternatives, and modifications. As outlined in FIG. 5, a process for managing address prefix information has the following steps:

1. providing a first access router 501;
2. forming a first communication link between a mobile node and the first access router 502;
3. sending a first request from the mobile node to the first access router for at least a unique prefix 503;
4. processing the first request 504;
5. identifying a second access router based on the first request 505;
6. sending a second request from the first access router to a second access router 506;
7. processing the second request by the second access router 507;
8. assigning the unique prefix to the mobile node in response to the second request 508;

9. sending the unique prefix from the second access router to the first access router 509; and 10. sending the unique prefix from the first access router to the mobile node 510.

It is to be appreciated that the various embodiments of the present invention provide advantages over conventional techniques. In various embodiments, the present invention provides an efficient technique for performing handover process in wireless networks. Among other things, by providing and managing address prefixes according to embodiments of the present invention, access routers in communication are able to efficiently assign prefix for MN's new CoA formulation to migrating MNs. In comparison to conventional techniques, embodiments of the present invention are more efficient and reliable, as address spaces for MNs are conserved. In addition, it is to be appreciated that embodiments of the present invention can be implemented for conventional network techniques and standards. For example, various embodiments of the present invention are compatible with conventional techniques and easily implemented. There are other benefits as well.

It is also understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method of performing handover in a network, the method comprising:
    sending a proxy router advertisement message from a previous access router to a mobile node, the advertisement message including information associated with at least an aggregate prefix;
    receiving a first care-of-address (CoA) from the mobile node by the previous access router, wherein the first CoA is in accordance with the aggregate prefix;
    forwarding the first CoA from the previous access router to a next access router;
    receiving a second CoA from the next access router by the previous access router, the second CoA in accordance with a unique prefix; and
    sending the second CoA to the mobile node by the previous access router.

2. The method of claim 1, wherein the aggregate prefix comprises an interface prefix or a separate prefix of the next access router.

3. The method of claim 1, wherein the second CoA has a same address interface identifier as the first CoA.

4. A method of performing handover in a network, the method comprising:
    receiving a first request from a previous access router by a next access router, the first request including at least a first care-of-address (CoA), the first CoA including an aggregate prefix;
    determining whether the first CoA is associated with the next access router;
    generating a second CoA for a mobile node, the second CoA including a unique prefix that is associated with the next access router; and
    sending the second CoA from the next access router to the previous access router.

5. The method of claim 4, wherein the first request comprises a handover initiate message; and wherein sending the second COA comprises sending the second COA as part of a handover acknowledge message.

6. The method of claim 5, wherein the aggregate prefix comprises an interface prefix or a separate prefix of the next access router.

7. The method of claim 5, wherein the second CoA has a same address interface identifier as the first CoA, the method further comprising coupling to the mobile node using the second CoA.

8. A system for communication, the system comprising:
    a first access router, configured to send at least an aggregate prefix to a mobile node, the aggregate prefix being associated with a second access router, receive at least a first CoA in accordance with the aggregate prefix from the mobile node, send the first CoA to the second access router, receive a second CoA from the second access router, and send the second CoA to the mobile node; and
    the second access router, configured to receive at least the first CoA from the first access router, generate the second CoA based at least on a unique prefix, and send the second CoA to the first access router.

9. The system of claim 8, wherein the aggregate prefix comprises an interface prefix or a separate prefix of the second access router.

10. The system of claim 8, wherein the second access router is further configured to determine whether the first CoA is associated with the second access router.

11. A system for communication, the system comprising:
    a first access router; and
    a second access router;
    the first access router configured to receive a first request from a mobile node by the first access router for at least a unique prefix, identify the second access router in accordance with the first request, send a second request from the first access router to the second access router, and receive a first reply including information for at least the unique prefix from the second access router; and
    the second access router configured to receive the first request from the first access router for at least the unique prefix, and send the first reply including information for at least the unique prefix to the first access router.

12. The system of claim 11, wherein the first request comprises a router solicitation for a proxy advertisement message.

13. The system of claim 11 wherein the first reply comprises a handover acknowledge message.

14. The system of claim 11, wherein the first access router is further configured to send a second reply comprising a proxy router advertisement message, to the mobile node.

15. The system of claim 11 wherein the second request comprises a handover initiate message.

16. A network apparatus comprising:
    a first network interface, the first network interface being configured to send a proxy router advertisement message to a mobile node, the proxy router advertisement message including information associated with at least an aggregate prefix, the first network interface being configured to receive a first care-of-address (CoA) in accordance with the aggregate prefix from the mobile node, and the first network interface being configured to send a second CoA in accordance with a unique prefix to the mobile node;
    a memory being configured to store system information;
    a processor being configured to generate the proxy router advertisement message; and
    a second network interface, the second network interface configured to forward the first CoA to a second access router, and the second network interface configured to receive the second CoA in accordance with the unique prefix from the second access router.

17. The network apparatus of claim 16, wherein the aggregate prefix comprises an interface prefix or a separate prefix of the second access router.

18. The network apparatus of claim 16, wherein the second CoA has a same address interface identifier as the first CoA.

19. A network apparatus implementing a method comprising:
receiving, by a second access router, a first request for at least a unique prefix from a first access router, wherein the first request is in accordance with a mobile node request to the first access router for at least the unique prefix;
processing the first request by the second access router;
assigning the unique prefix to the mobile node in response to the first request; and
sending the unique prefix to the first access router.

20. The network apparatus implementing the method of claim 19, further comprising connecting to the mobile node using the unique prefix.

21. The network apparatus implementing the method of claim 19, wherein the second CoA has a same address interface identifier as the first CoA.

22. The network apparatus implementing the method of claim 19, wherein the first request comprises a handover initiate message; and wherein sending the unique prefix comprises sending the unique prefix as part of a handover acknowledge message.

23. A mobile node implementing a method comprising:
receiving a proxy router advertisement message from a first access router, the advertisement message including information associated with at least an aggregate prefix;
generating at least a first care-of-address (CoA) by the mobile node in accordance with the aggregate prefix;
sending the first CoA to the first access router; and
receiving a second CoA in accordance with a unique prefix from a second access router via the first access router.

24. The mobile node implementing the method of claim 23, further comprising, before receiving the proxy router advertisement message, sending a first request from the mobile node to the first access router for the unique prefix.

25. The mobile node implementing the method of claim 24, further comprising detecting a movement of the mobile node before sending the first request.

26. The mobile node implementing the method of claim 24, wherein the first request comprises a router solicitation for the proxy advertisement message.

27. The mobile node implementing the method of claim 23, further comprising the mobile node coupling to the second access router using the second CoA.

28. The mobile node implementing the method of claim 27, wherein the second CoA has a same address interface identifier as the first CoA.

* * * * *